Figure 1:
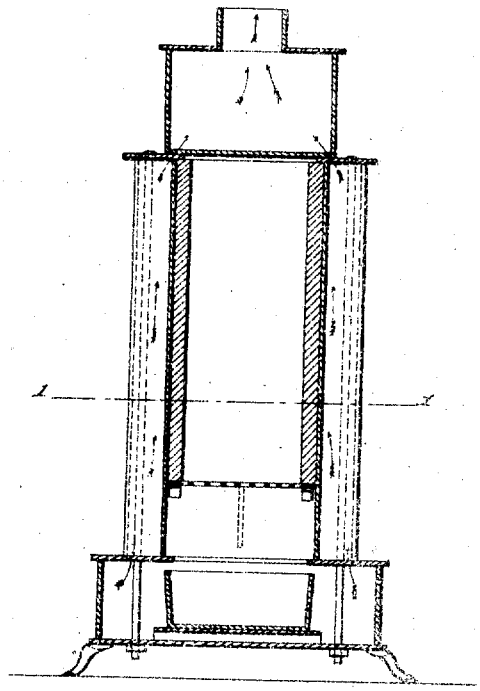
Figure 2:
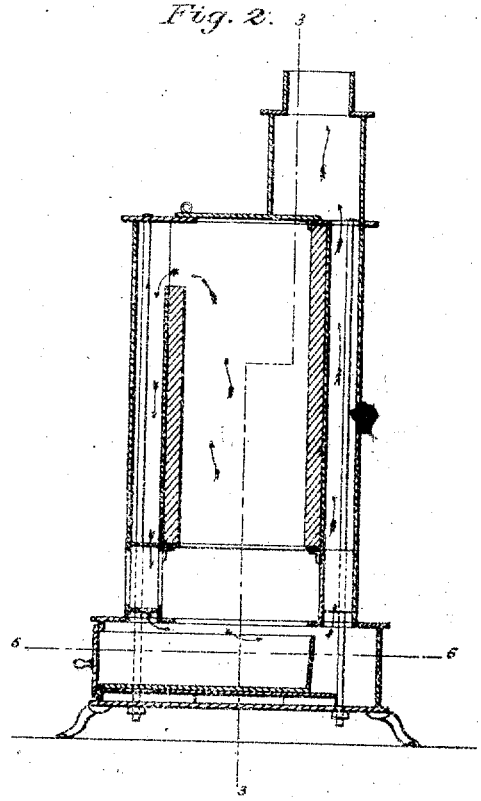
Figure 3:
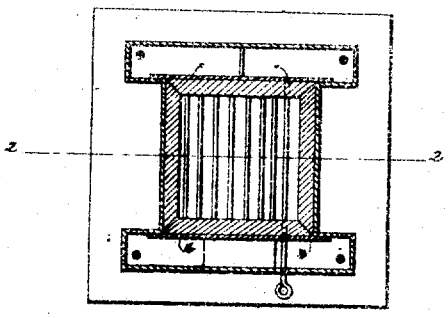
Figure 4:
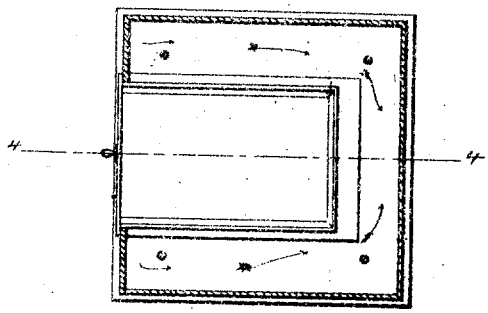

C. W. PECKHAM.

8827X

Heating-Stoves.

Patented May 16, 1835.

NO PRINTED COPY OF SPECIFICATION IN OFFICE.

Charles W. Peckham, of New Haven, Conn.
Letters Patent.

The schedule referred to in these Letters Patent and making part of the same containing a description in the words of the said Charles W. Peckham himself of his improvement in Stoves for warming rooms. – –

To all persons to whom these presents shall come:
Be it known that I Charles Welch Peckham of New Haven in the State of Connecticut, a native citizen of said State, have invented a new and useful improvement in Stoves for Warming Rooms, which I call Peckhams improved reverberating Stove, and that the following is a full and exact description of the construction and operation of the said Stove as invented and improved by me; my improved Stove is made of cast iron plates and is calculated for anthracite coal but other fuel may be used and it may be made of other materials.
It consists of a base, a body, a top, chamber and a conducting pipe. To make the specification the more intelligible, I give the dimensions of one I have erected but they may be made larger or smaller as occasion shall require. The base is supported on legs three and a half inches high. The hight & thickness of the base is six inches, it is seventeen inches long in front and rear, and fifteen inches on the sides on a plate covering the whole bottom and covered on the top by a plate having open orifices as hereinafter described thus forming a chamber extending over the whole base. On this base rests the body of the stove two feet in hight, fifteen and a half inches wide in front and rear and thirteen and an half inches deep, covered by a top plate seventeen by fifteen inches broad having an orifice of the size of the chamber above it, & extending in front of it for feeding. On the top of this plate I place a chamber on the back side at equal distance from each end ten inches long by six inches on the ends & seven inches high covered with a plate on the top from the centre of which a collar is raised for a five inch conducting pipe. Thus is formed the outward shell of the stove which may be ornamented by carved work on the pattern to suit the fancy. The inside of the stove is divided & arranged as follows. An inner front plate rises from the top plate of the base about twenty inches having a space between the top of the top of that & the top plate of the stove body, an inner rear plate rises from the top plate of the base, to the top plate of the body both so placed in grooves as to leave a space betweene the outer and inner plates of one and an half inch with an open communication of the same dimensions thro' the top plate of the base into the base chamber. I place a grate with a draw bar, four and an half inches above the top of the base eleven by nine inches on the sides, supported by flanges on the end and inner plates of the body and directly under the grate, is an orifice of the same size as the grate, thro the top plate of the base to discharge the ashes into the draw below as hereafter describ-bed. There is an opening on both the front plates below the grate four by four inches square to admit air under the grate. This opening may be closed in whole or in part by doors & is surrounded by a box or ledge two inches deep to close around it, the opening be-tween the plates and to cut off thereby all communication between the passages for the air and for the flames. The chamber formed by the inner plates in the body of the stove is armed on the inside above the grate with a lining of soap stone or fire brick to the top plate except about four inches in front. In the base chamber directly under the grate and under the opening in the top of the base I place a draw to receive the ashes from the grate; this draw is four inches deep nine inches broad and eleven long to cor-respond with the size of the grate. This draw is moveable and may be taken out. Above this draw or pan, between it and the grate, at the bottom of the stove body, is a slide covering the whole opening in the top plate of the base under the grate. On this slide when in place the droppings from the grate fall. It may when occasion requires be drawn out on side of the stove and thereby discharge the ashes into the pan or draw below, and is then returned to its place. There is also an opening left in the top plate of the body of the stove nine inches long and six broad in front of the opening under the top chamber thro which the fuel is passed into the stove.

This opening is also covered by a sliding valve which may be extended two and an half inches under the front of the upper chamber to regulate the draft by closing in whole or in part the direct communication between the fire and the upper chamber. The operation of this stove is as follows, when the fire is kindling, the upper sliding valve should be drawn forward so as to leave the upper chamber wholly open to the fire and the draft thereby forming a direct communication between the fire & the discharging pipe. When the fire burns freely, the same valve may be slid in under the front plate of the chamber to the top of the rear inner plate so as to completely close that communication and thereby cause the fumes of the fire to rise and pass over the inner front plate and descend between that and the front plate and passing thro' the whole chamber of the base, its sliding valve being closed then rises between the two back plates into the upper chamber of the stove and thence into the discharging pipe, where it may be again regulated or retarded by a valve on pivots. By thus reverberating and passing slowly between the plates of the stoves in front and rear in channels of the shape and size described and thro' the whole chamber of the base great surface is exposed for the diffusion of heat which would otherwise be lost. For further illustration I refer to the model and drawings accompanying this specification — —

I claim specially as my invention the peculiar construction of the base and its connection with the body of the stove as above described, by means of which the whole of the fumes may be made to pass thro' its extensive chamber without interruption diffusing heat from all parts of it. I also claim as my invention and improvement the shape and construction of the body of the stove as above described by means of which the reverberation of the fumes is carried round the stove in flat pipes or conductors thereby exposing more surface for the diffusion of heat than could be obtained from round ones containing the same matter & therefor I solicit letters Patent according to Law.

New Haven Feby 28th A.D. 1835.

Witnesses
Ralph B. Steele
John Hunt

Charles H. Peckham

Exd
[illegible]

[illegible]